United States Patent
Becker et al.

(10) Patent No.: US 9,870,520 B1
(45) Date of Patent: Jan. 16, 2018

(54) ITERATIVE PROCESS FOR OPTIMIZING OPTICAL CHARACTER RECOGNITION

(71) Applicant: INTUIT INC., Mountain View, CA (US)

(72) Inventors: Richard J. Becker, St. Albert (CA); Horace Chan, Edmonton (CA); Neha Sikri, Fremont, CA (US); Daniel L. Moise, Edmonton (CA)

(73) Assignee: INTUIT INC., Mountain View, CA (US)

(*) Notice: Subject to any disclaimer, the term of this patent is extended or adjusted under 35 U.S.C. 154(b) by 390 days.

(21) Appl. No.: 13/957,709

(22) Filed: Aug. 2, 2013

(51) Int. Cl.
  *G06K 7/10* (2006.01)
  *G06K 9/62* (2006.01)
  *G06K 9/00* (2006.01)
  *G06K 9/03* (2006.01)
  *G07B 17/00* (2006.01)
  *G06K 9/68* (2006.01)

(52) U.S. Cl.
  CPC ....... *G06K 9/6262* (2013.01); *G06K 9/00852* (2013.01); *G06K 9/03* (2013.01); *G06K 9/6217* (2013.01); *G06K 2009/6864* (2013.01); *G06K 2209/01* (2013.01); *G07B 2017/00725* (2013.01)

(58) Field of Classification Search
  CPC .......... G06K 9/03; G06K 9/68; G06K 9/3258; G06K 2209/01; G06K 9/6262; G06K 9/6217; G06K 9/00; G06K 9/00852; G06K 9/325; G06K 9/344; G06K 9/6229; G06K 9/6807; G06K 9/72; G06K 9/723; G06K 2009/6864; G07B 2017/00725; H04N 1/00331

USPC ....... 382/309, 181, 310, 321, 100, 101, 105, 382/112, 135–140, 182, 311
  See application file for complete search history.

(56) References Cited

U.S. PATENT DOCUMENTS

| | | | | | |
|---|---|---|---|---|---|
| 4,177,448 | A | * | 12/1979 | Brayton | G06K 9/66 382/203 |
| 5,418,864 | A | * | 5/1995 | Murdock et al. | 382/309 |
| 5,519,786 | A | * | 5/1996 | Courtney | G06K 9/6292 382/310 |
| 5,805,747 | A | * | 9/1998 | Bradford | G06K 9/6292 382/185 |

(Continued)

OTHER PUBLICATIONS

Michael D. Garris, James L. Blue, Gerald T. Candela, Darrin L. Dimmick, Jon Geist, Patrick J. Grother, Stanley A Janet, and Charles L. Wilson, "Public domain optical character recognition", Proc. SPIE 2422, Document Recognition II, Mar. 1995, pp. 2-14.*

*Primary Examiner* — Eric Rush (57) ABSTRACT

The disclosed embodiments relate to a system and method for calibrating optical character recognition (OCR) processes for an image captured through a mobile computing device. During operation, the system adjusts the OCR process through pre-recognition functions, OCR functions and/or post-recognition functions with multiple sets of parameter settings. With each of these sets, the system scores the OCR process output against an image with known text. Once the sets are scored, the system sorts the sets of parameters, removes some sets, then mixes and mutates the remaining sets in a process akin to evolutionary biology. By repeating this procedure, the system produces a set of parameter settings that can be used to calibrate OCR processing.

22 Claims, 5 Drawing Sheets

(56) References Cited

U.S. PATENT DOCUMENTS

| | | | |
|---|---|---|---|
| 6,571,013 B1* | 5/2003 | Macey | G06K 9/6228 382/181 |
| 6,944,340 B1* | 9/2005 | Shah | G06K 9/00993 382/187 |
| 7,031,519 B2* | 4/2006 | Elmenhurst | 382/181 |
| 7,203,361 B1* | 4/2007 | Meier | 382/173 |
| 7,480,411 B1* | 1/2009 | Tzadok | G06K 9/03 382/182 |
| 8,773,733 B2* | 7/2014 | Blose | G06K 9/723 358/450 |
| 9,043,349 B1* | 5/2015 | Lin | G06K 9/18 382/257 |
| 2004/0010758 A1* | 1/2004 | Sarkar | G06K 9/03 715/256 |
| 2004/0158469 A1* | 8/2004 | Brand | G06K 9/03 704/240 |
| 2006/0071950 A1* | 4/2006 | Kurzweil | G06T 5/006 345/698 |
| 2007/0211942 A1* | 9/2007 | Curtis | G06K 9/6292 382/181 |
| 2008/0144977 A1* | 6/2008 | Meyer et al. | 382/309 |
| 2011/0103688 A1* | 5/2011 | Urbschat et al. | 382/182 |
| 2011/0228085 A1* | 9/2011 | Hofman | 348/143 |
| 2012/0134589 A1* | 5/2012 | Reddy | G06K 9/6255 382/182 |
| 2012/0287070 A1* | 11/2012 | Wang et al. | 345/173 |
| 2013/0028481 A1* | 1/2013 | Wu | 382/105 |
| 2014/0363052 A1* | 12/2014 | Kozitsky et al. | 382/105 |

* cited by examiner

ITERATIVE PROCESS FOR OPTIMIZING OPTICAL CHARACTER RECOGNITION

BACKGROUND

Related Art

The disclosed embodiments generally relate to techniques for optimizing an optical character recognition (OCR) process. More specifically, the disclosed embodiments relate to a technique for optimizing parameter values for an OCR process performed on an image captured through a mobile device.

Mobile devices have evolved rapidly, from simple cellphones only a few years ago to powerful camera-equipped smartphones and tablets today. This vast increase in mobile computing capabilities has encouraged the development of numerous new applications. In particular, as businesses and consumers begin to combine these camera-equipped mobile devices with off-the-shelf OCR applications, they are able to use these devices to capture images of text and convert the text into digital form. However, the transition of OCR to mobile platforms is not without challenges.

A major problem for mobile OCR processing is quality control. Originally, engineers developed OCR processing for images captured under tightly controlled conditions, such as on a flatbed scanner with known lighting, focal length and lens quality. In contrast, mobile devices operate in widely varying environments and capture images with widely varying sets of equipment. Either of these variances can easily affect mobile OCR processing results by way of vastly different lighting, lens quality, resolution and the like. Consequently, OCR output from images captured through mobile devices tends to be less accurate than that from images captured in a controlled environment.

Fortunately, images captured by mobile devices can be adjusted to compensate for those factors that affect OCR processing. For example, users can adjust saturation, contrast, luminosity, glare and color space to improve OCR results. However, determining the optimal adjustments for any specific set of circumstances presents a challenge. Users can manually make adjustments through trial-and-error and rule-of-thumb techniques to improve their OCR results, but such techniques are uncertain, time-consuming and tedious. Consequently, mobile OCR processing may be facilitated by systems and techniques to make such adjustments automatically and efficiently.

SUMMARY

The disclosed embodiments relate to a system for OCR optimization that automatically calibrates various process settings to accommodate widely varying environments. During operation, the system makes one or more adjustments to an image captured for OCR processing (e.g., alterations to contrast, hue and/or luminosity). Each of these adjustments might improve OCR processing on a given image in a given environment. For each of these adjustments, the system makes alterations in increments determined by parameter settings. After modifying the image, the system processes it with an OCR application and outputs digital text.

In the disclosed embodiments, the system iterates this process for multiple sets of parameter settings to determine a calibration. Each set of parameter settings is a "candidate" for calibrating OCR processing in a given environment. First, the system determines an initial group, or "population," of candidates. Next, the system alters a captured image with known text according to each candidate's parameter settings, producing a modified image. After creating each modified image, the system processes it with an OCR application and scores the output against a known result. Finally, the system associates that score with the candidate that gave rise to it.

After the modified images are processed and scored, the system sorts the candidates in a process akin to biological evolution. In this analogous process, the candidates might correspond to living individuals in a group; a candidate's score might correspond to its relative fitness; and a candidate's parameter settings, which give rise to a modified image, might correspond to its DNA. As nature winnows a herd of animals by allowing the strong to live, while predators cull the herd of weaker members, similarly, the disclosed embodiments separate the tested candidates by keeping those with better results while discarding those with worse results.

The system further mimics nature through a process of mixing or "mating." In this process, the system takes the component parameter settings from surviving candidates and mixes them to create new candidates.

Repeating this sequence with the new candidates, the system iterates until a termination condition is reached. The system may iterate until a predetermined number of cycles completes or until there is a candidate that scores above a predetermined threshold. After a termination condition is reached, a high-scoring candidate that can calibrate OCR processing in the given environment is output.

In some embodiments, adjustments are made not only to the captured image, but also to the OCR application and/or to further processes on the OCR output text.

In some embodiments, the system determines the initial population of candidates through a random process.

In some embodiments, after mixing the candidates, the system further emulates nature by mutating the candidates.

In some embodiments, the system acquires environmental information and uses that information to adjust candidates.

The disclosed techniques are useful for solving real-world OCR problems. For example, suppose a user needs to scan a series of printed checks with a smartphone. Further suppose the user must input the information on the checks into an accounting program, such as QuickBooks™ distributed by Intuit, Inc. of Mountain View, Calif. In this scenario, the user is faced with a daunting number of possible combinations of processing adjustments that might be done to achieve the best OCR results. By using the disclosed system, the user can quickly and automatically calibrate a combination of settings to achieve high-quality OCR processing of the checks.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a system for processing OCR on images captured in varying environments. Such images may be collected using a mobile device. By their nature, users operate mobile devices in widely varying situations, in which environmental and other factors (e.g., light, contrast, lens quality) might affect image capture. These factors can have a significant effect on OCR processing quality. To counter this effect, the disclosed embodiments use OCR processing adjustments, as detailed below. Many modifications and variations will be apparent to those skilled in the art. These examples and procedures are for illustrative purposes only and are not intended to limit the embodiments to the forms disclosed.

More specifically, the disclosed embodiments provide a system for calibrating adjustments to improve an OCR process. The embodiments can use a combination of pre-OCR image adjustments, OCR application adjustments, and/or post-OCR digital text adjustments to improve OCR processing results. This combination of functions will be referred to as the "OCR process," which is distinguished from standalone OCR applications such as ABBYY® FineReader. Each of the adjustments in the OCR process can be set in increments, which the system controls through parameter settings. In the disclosed embodiments, the system tests multiple sets of these parameter settings to calibrate OCR processing. Each set of parameter settings, or "candidate," is a complete set of parameter settings for the OCR process. Hence, each candidate represents a potential calibration setting for the OCR process. Taking multiple candidates, the disclosed embodiments iteratively test, sort and manipulate them to determine a suitable candidate for calibrating OCR processing.

In the disclosed embodiments, the system determines a calibration with an evolutionary-type winnowing process. In some embodiments, the system randomly creates candidates and then tests them against one another. Next, the system removes the lower-scoring candidates and mixes the better ones together to create new candidates. The system then repeats testing, separating and mixing with the new candidates. The system continues this process until a terminal condition is reached, when the system outputs a high-scoring candidate for use as an OCR processing calibration standard for a given environment.

Figure 1:
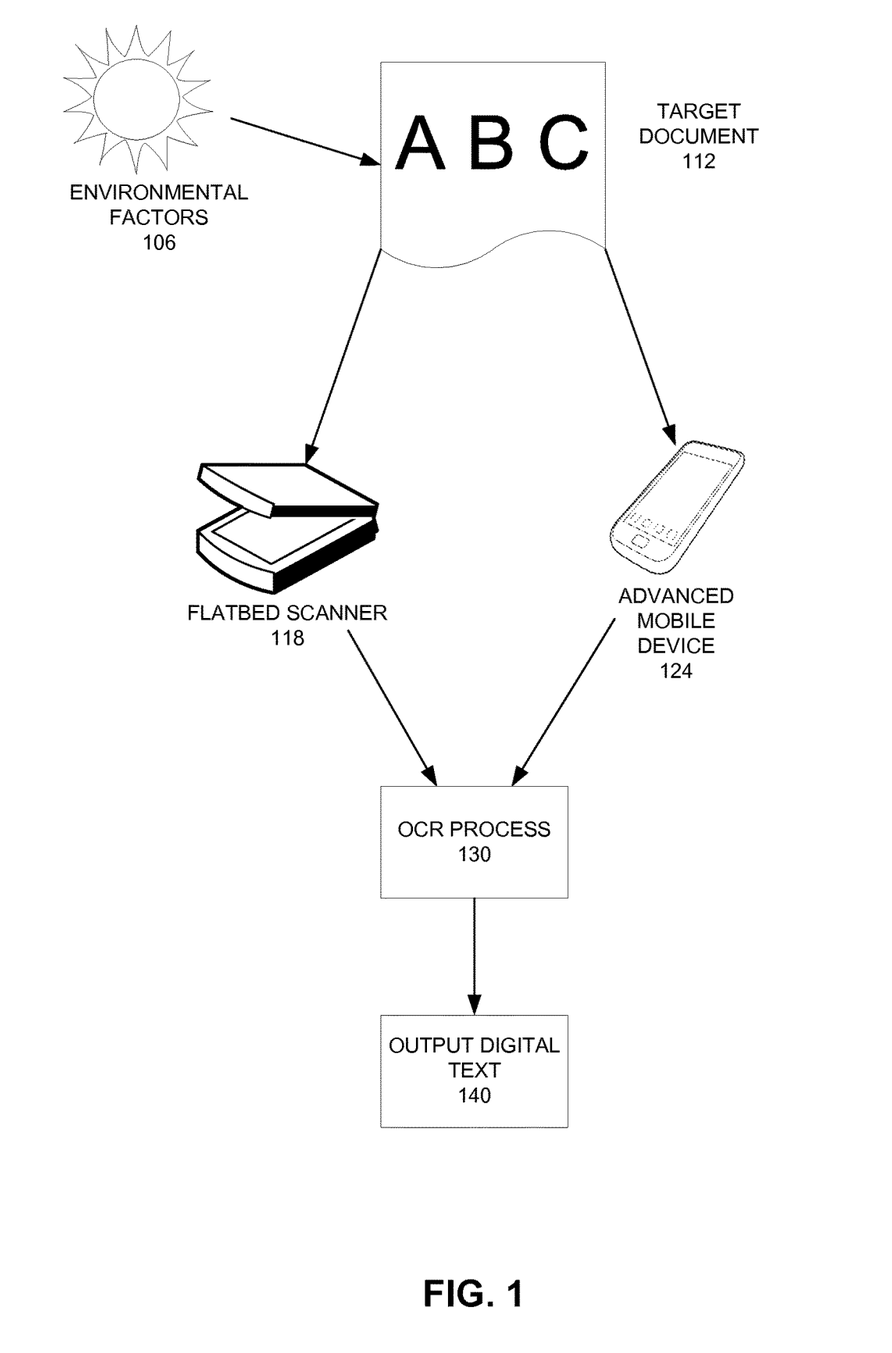
FIG. 1 illustrates a production environment in accordance with the disclosed embodiments.

FIG. 1 illustrates a production environment in accordance with the disclosed embodiments. As shown, numerous environmental factors 106 can affect image capture quality for a target document 112. When OCR was first developed, images were almost exclusively captured on flatbed scanners 118 under closely controlled conditions. With the arrival of advanced mobile devices 124, environmental and other factors (e.g., lighting, camera vibration, color, resolution, lens quality) became significant. Further, in the modern world, image capture is not limited to dedicated cameras or smartphones, but might also be done by other devices (e.g., laptop webcams, traffic cameras, scanning mice, drones, security devices). Such devices can have an even wider range of image quality.

Environment- and equipment-related variances are not the only factors affecting OCR processing output. For example, the target text might be difficult to distinguish if it is printed on material that is particularly reflective or particularly dull. Moreover, background color or drawings underneath the target text can interfere with OCR processing. Such background images are particularly common with commercial checks written by consumers. All of these are problems wherein the disclosed embodiments can improve OCR processing by manipulations and adjustments such as those described below. In each case, the system can use parameter settings to input the incremental adjustments needed in each function to improve output quality.

The disclosed embodiments are a system to automatically determine such parameter settings. As shown in FIG. 1, after an image is captured, the system starts the OCR process 130. As already mentioned, the OCR process 130 might include modifications to the captured image, adjustments to a commercial OCR application and/or modifications to the digital text prior to output, a process that will be detailed in FIG. 2. When complete, the OCR process 130 outputs digital text 140 for processing (e.g., storage, display, dissemination, printing, pager display, speech synthesizer output). To improve the accuracy of the output digital text 140, the disclosed embodiments calibrate the OCR process 130. Hence, the OCR process 130 is examined in detail below.

The OCR Process

Figure 2:
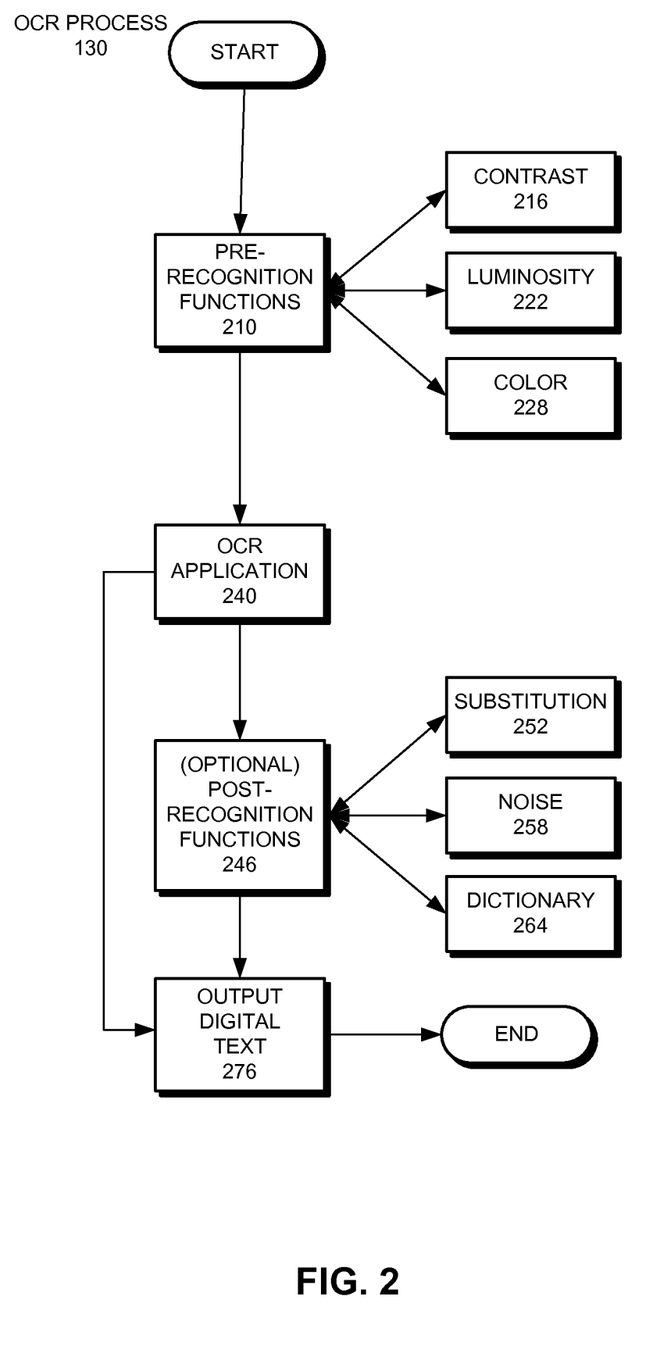
FIG. 2 illustrates a flowchart of the OCR process in accordance with the disclosed embodiments.

FIG. 2 illustrates a flowchart of the OCR process in accordance with the disclosed embodiments. In starting the OCR process 130, the system begins with adjustments to the captured image via pre-recognition functions 210. For example, pre-recognition functions 210 may include adjustments to contrast 216, luminosity 222, color 228, hue, brightness, saturation, luminosity, glare reduction, and/or greyscale. Additional adjustments might include functions for OCR dropout color filters, color removal, deskew, despeckle, noise reduction, object identification, edge detection and ratio confirmation. The system adjusts these functions through candidates of parameter settings, which are detailed in FIG. 3. All of these image adjustments may improve the accuracy of OCR application processing. These pre-recognition functions ultimately produce a modified image.

Next, the system submits the modified image to an OCR application 240. The system processes OCR using standard packages, such as ABBYY® FineReader, Readiris™ or Tesseract, or any other program or system capable of OCR application processing. In some embodiments, the system may adjust OCR application processing through input parameter settings. Using the modified image, the OCR application outputs digital text.

Optionally, after the digital text is output, the system can also run post-recognition functions 246 to clarify the text. As with pre-recognition functions 210, the system controls post-recognition functions 246 through parameter settings organized in the candidates. After inputting parameter settings, the system can process post-recognition functions 246 including, but not limited to, character substitution 252, noise removal 258 and/or individual dictionary word lookup routines 264. Additionally, these post-recognition functions 246 can include operations such as regular-expression pattern matching, grammar confirmation, regular-expression pattern conformance, syntactic parsing, semantic parsing based on context and/or common contextual word or letter replacement. Finally, the system outputs digital text 276.

Candidates

Figure 3:
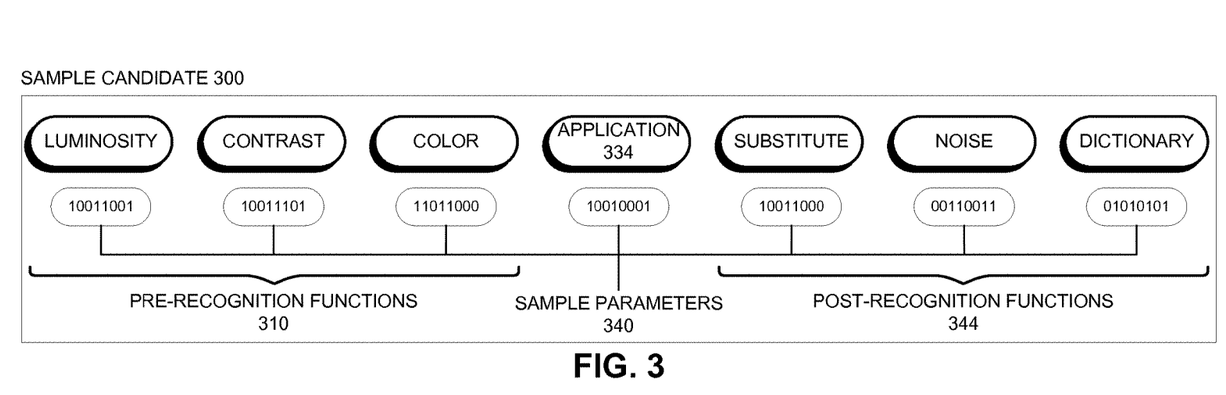
FIG. 3 illustrates a sample candidate for parameter settings in accordance with the disclosed embodiments.

FIG. 3 illustrates a sample candidate for parameter settings in accordance with the disclosed embodiments. The system uses candidate sets of parameter settings (i.e., potential calibration settings) to calibrate the OCR process 130. The sample candidate 300 includes one parameter setting for each function to be tested in OCR process 130. In the illustrated example, the sample candidate 300 inputs seven different parameter settings for testing. Each of the parameters inputs a pre-recognition function 310, the OCR application 334 or a post-recognition function 344. In this example, each parameter 340 is an 8-bit number, allowing 256 incremental adjustments to each function. The system may use other methods for coding incremental adjustments (e.g., 16-bit).

Figure 4:
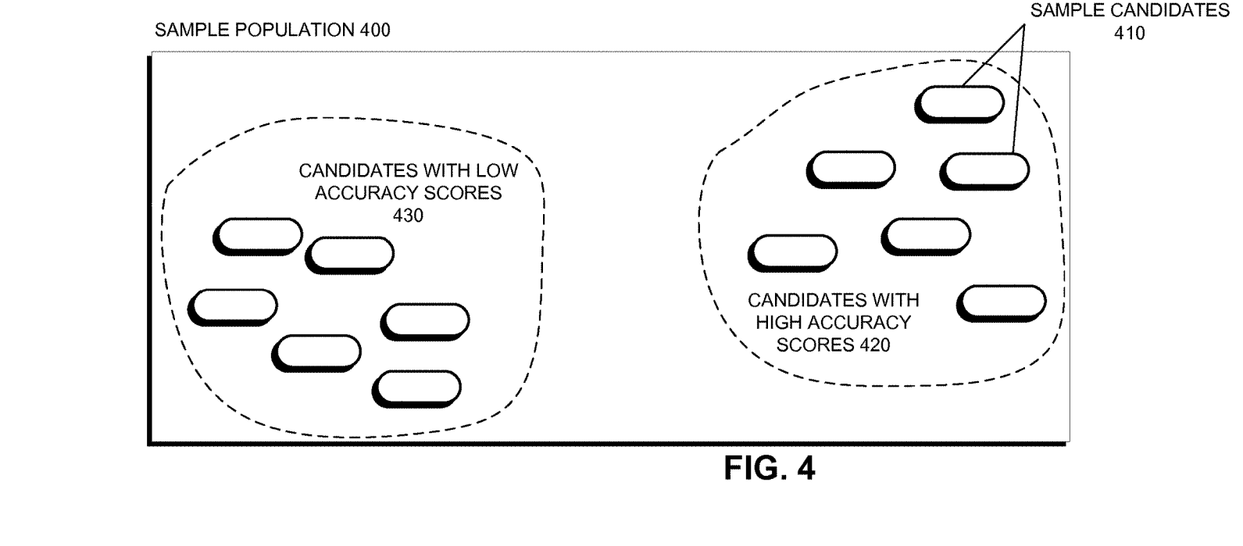
FIG. 4 illustrates a sample population of candidates, with some candidates scoring relatively well and some scoring relatively poorly, in accordance with the disclosed embodiments.

FIG. 4 illustrates a sample population of candidates, with some candidates scoring relatively well and some scoring relatively poorly, in accordance with the disclosed embodiments. In this exemplary population, the system has processed twelve sample candidates 410 and scored them. The system has sorted the population into candidates with high 420 and low 430 accuracy scores.

Optimization Pipeline

Figure 5:
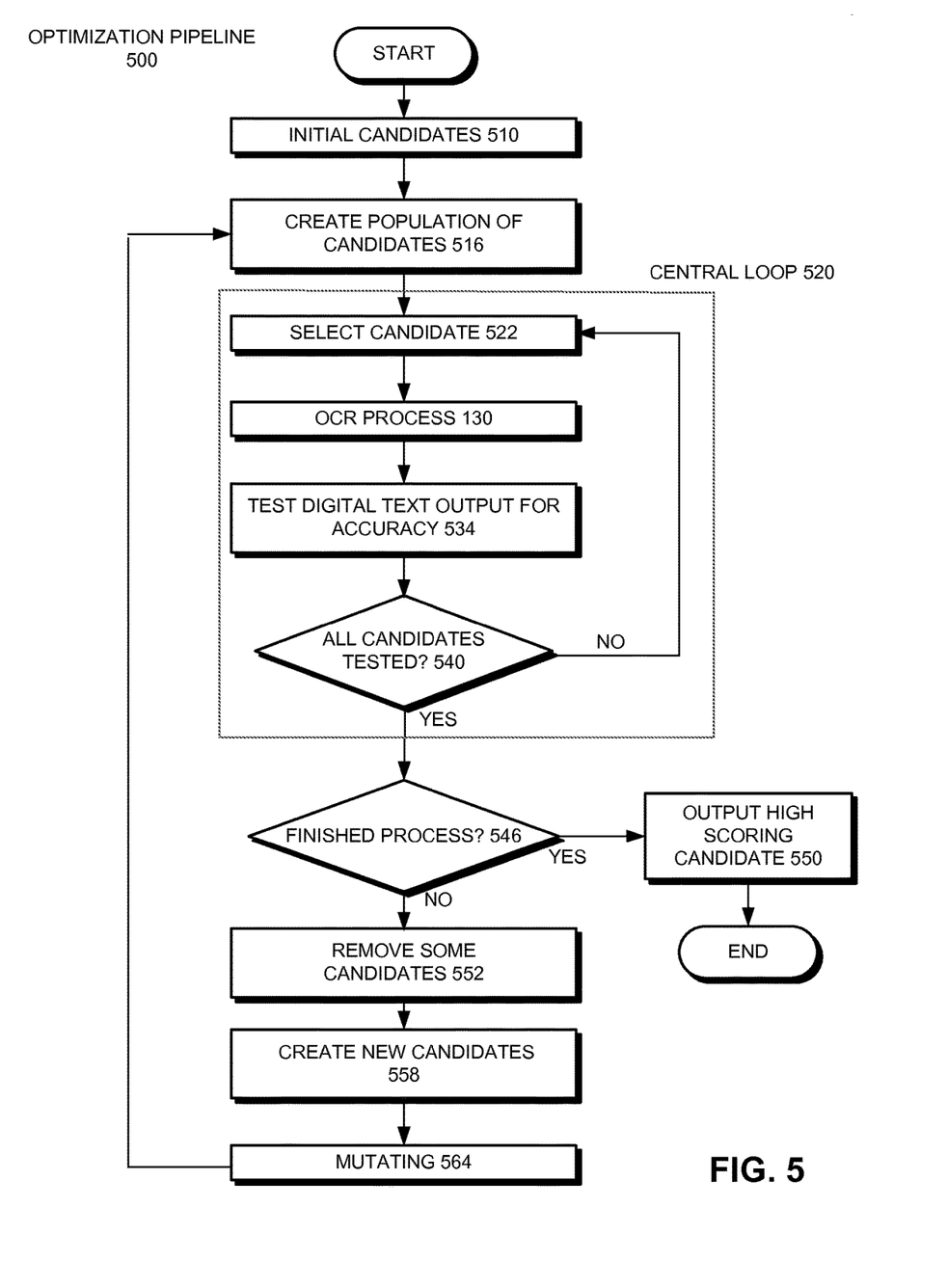
FIG. 5 presents a flowchart of the optimization pipeline in accordance with the disclosed embodiments.

FIG. 5 presents a flowchart of the optimization pipeline 500 in accordance with the disclosed embodiments. To start iterating the optimization pipeline 500, some embodiments create initial candidates (operation 510). To create initial candidates, the system can use manual inputs (e.g., user input), automated processes (e.g., randomized values, predetermined settings, prior tested candidates) or some combination of manual and automated processes. Next, the system creates a population of candidates (operation 516).

With a population of candidates ready, the system starts the central loop 520. The system selects a candidate 522, uses the candidate settings to calibrate the OCR process 130 on an image with known text and then tests the digital text output for accuracy 534. In scoring the candidates, the system tests each of the resulting digital text outputs for accuracy against the known text. The accuracy tests might employ grid-based tests, row-based tests or word-based tests. In a grid-based test, a document 'deemed' correct is mapped to a grid with a 1.0 score having all characters correct and in the correct location within the grid, wherein deductions for misses are applied to the 1.0 score. Likewise, in a row-based test, a document 'deemed' correct is based on lines, with a 1.0 score having all characters in the correct order on the correct line, wherein deductions for misses are applied to the 1.0 score. Finally, in a word-based test, a document 'deemed' correct is based on how many correct words were derived. After testing, the system assigns a score to each candidate, and then proceeds with the next candidate until all of the candidates in the population have been tested (operation 540).

Once all of the candidates have been tested, the system determines if the optimization pipeline 500 has finished processing (operation 546). In some embodiments, the completion of the optimization pipeline 500 can occur after a predetermined number of populations have been tested. In some embodiments, completion can be achieved after the system has produced a candidate with a score above a predetermined threshold. Once the optimization pipeline 500 is complete, the system outputs a high-scoring candidate 550 of parameter settings suitable for calibrating OCR processes in a given environment and finishes processing.

If the optimization pipeline is not complete, the system proceeds to the mixing stage. At the mixing stage, the system emulates some features of biological evolution. In biological evolution, the strong survive while the weak perish; similarly, the system retains higher-scoring candidates while removing lower scoring ones (operation 552). In some embodiments, the system may retain some weaker candidates in order to further test their parameter settings.

Continuing the biological metaphor, the system mixes or "mates" the surviving candidates. In some embodiments, the system randomly mixes the individual parameter settings from two surviving candidates with one another to create "child" candidates. In some embodiments, the system mixes the parameter settings from any number of surviving candidates to produce new candidates. Finally, the system can use mathematical methods to adjust or mix the parameter settings during the process of creating new candidates 558, including but not limited to random adjustments, gradients, and weighted means.

After creating new candidates, the system can further mimic biological evolution by mutating 564 the new candidates. Mutations can change some or all of the parameters in an existing candidate or even create new candidates. Note that mutations are not necessarily random, as the system can also use other methods to change parameters (e.g., user input, received values, automatic processes, mathematical functions). Mutations 564 can be performed before, during or after the system creates a population.

After mutating 564, the system cycles back to the testing loop. The system creates a new population from the new candidates 516. From this new population, the central loop 520 for testing candidates begins again, including selecting candidates 522, OCR processing 130 and testing output 534.

Continuing, the system can iteratively repeat the optimization pipeline 500 until a terminal condition 546 is met. Once a terminal condition is met, the system can output a high-scoring candidate 550 for use as an OCR processing calibration standard for a given environment.

Mobile Device

Figure 6:
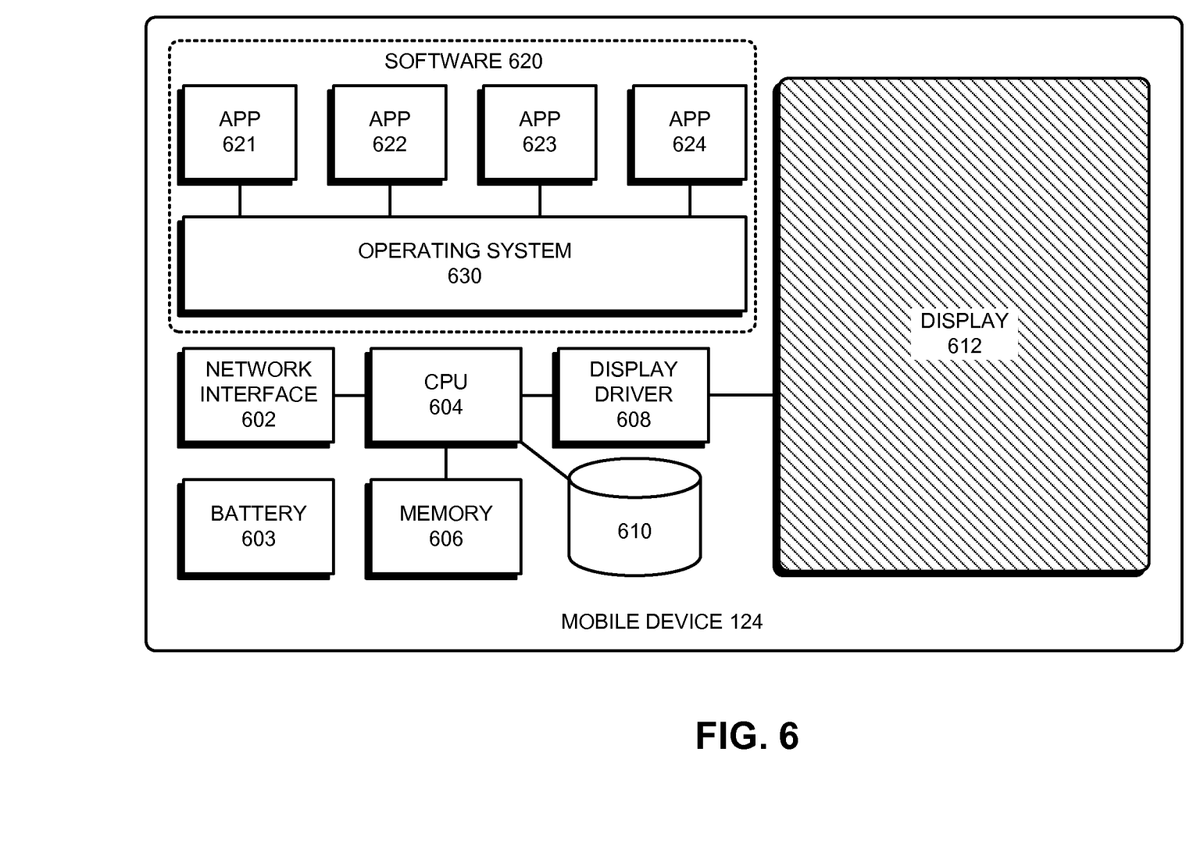
FIG. 6 illustrates a computing device in accordance with the disclosed embodiments.

The disclosed embodiments may function on a mobile device. FIG. 6 illustrates the internal structure of a mobile device 124 in accordance the disclosed embodiments. Mobile device 124 includes a number of hardware components, including a network interface 602, a battery 603, a central-processing unit (CPU) 604, a memory 606, a non-volatile storage device 610, display driver circuitry 608 and a display 612. Network interface 602 can include any type of circuitry for interfacing with a network, such as a WiFi network, a 3G or 4G data network, a Bluetooth™ network, or generally any type of wireless or wired communication network. Battery 603 can generally include any type of rechargeable (or non-rechargeable battery) that is used to power mobile device 124. CPU 604 can generally include any type of single-core or multi-core processing engine. Memory 606 can generally include any type of random-access memory that can store code and data to be used or manipulated by CPU 604. Display driver circuitry 608 can generally include any type of graphics-processing and amplification circuitry for driving display 612. Finally, display 612 can include any type of display that can be incorporated into mobile device 124, such as the touchscreen (or non-touchscreen) display for a smartphone or a tablet computer.

Mobile device 124 also includes various software components 620, including an operating system 630, which can be used to execute various mobile applications 621-624. For example, the operating system can include the Android™ operating system distributed by Google, Inc. of Mountain View, Calif., or alternatively the iOS™ operating system distributed by Apple Inc. of Cupertino, Calif. Moreover, mobile applications 621-624 can include mobile applications that can execute on the Android™ or iOS™ operating systems. During operation, at least one of mobile applications 621-624 can calibrate OCR processing as is described in more detail above with reference to FIGS. 2-5.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for optimizing parameter settings for an optical character recognition process, comprising:
    receiving a population comprising at least two sets of parameter settings;
    receiving an image comprising known text;
    for each set of parameter settings in the population, determining an accuracy score by:
        executing a set of pre-recognition functions using the set of parameter settings to modify the image according to the parameter settings to produce a modified image;
        executing an optical character recognition function on the known text in the modified image to produce an output; and
        testing the output to determine the accuracy score for the set of parameter settings by comparing the known text to the output;
    selecting a first set of parameter settings from the population based on the determined accuracy scores;
    receiving a second image separate from the image;
    executing the set of pre-recognition functions using the first set of parameter settings to modify the second image according to the first set of parameter settings to produce a modified second image; and
    executing the optical character recognition function on the modified second image to produce a second output.

2. The method of claim 1, wherein after determining an accuracy score for each set of parameter settings in the population, the method further comprises:
    iteratively performing the following operations:
        removing at least one set of parameter settings from the population based on the accuracy scores; and
        mixing the parameter settings from the remaining sets of parameter settings to form new sets of parameter settings in the population.

3. The method of claim 2, wherein after mixing the parameter settings to form new sets of parameter settings, the method further comprises randomly changing at least one parameter setting in at least one set of parameter settings in the population.

4. The method of claim 2, wherein the operations are iteratively performed until at least one of the accuracy scores exceeds a predetermined threshold.

5. The method of claim 1, wherein executing the optical character recognition function involves using the set of parameter settings.

6. The method of claim 1, wherein after executing the optical character recognition function, the method further comprises executing a set of post-recognition functions using the set of parameter settings to modify the output.

7. The method of claim 1, wherein the method further comprises adjusting at least one of the sets of parameter settings based on environmental factors associated with acquisition of the image.

8. The method of claim 1, wherein receiving the image comprising known text comprises receiving the image comprising known text in a first environment, wherein receiving the second image separate from the image comprises receiving the second image in the first environment, and further comprising:
    receiving a third image comprising known text in a second environment;
    for each set of parameter settings in the population, determining a second accuracy score by:
        executing the set of pre-recognition functions using the set of parameter settings to modify the third image according to the parameter settings to produce a modified third image;
        executing the optical character recognition function on the known text in the modified third image to produce a third output; and
        testing the third output to determine the second accuracy score for the set of parameter settings by comparing the known text to the third output;
    selecting a second set of parameter settings from the population based on the determined second accuracy scores;
    receiving a fourth image separate from the third image in the second environment;
    executing the set of pre-recognition functions using the second set of parameter settings to modify the fourth image according to the second set of parameter settings to produce a modified fourth image; and executing the optical character recognition function on the modified fourth image to produce a fourth output.

9. A non-transitory computer-program product for use in conjunction with a computer system, the computer-program product comprising a computer-readable storage medium and a computer-program mechanism embedded therein, to optimize parameter settings for optical character recognition, the computer-program mechanism including:

instructions for receiving a population comprising at least two sets of parameter settings;

instructions for receiving an image comprising known text;

for each set of parameter settings in the population, instructions for determining an accuracy score by:
executing a set of pre-recognition functions using the set of parameter settings to modify the image according to the parameter settings to produce a modified image;
executing an optical character recognition function on the known text in the modified image to produce an output; and
testing the output to determine the accuracy score for the set of parameter settings by comparing the known text to the output;

instructions for selecting a first set of parameter settings from the population based on the determined accuracy scores;

instructions for receiving a second image separate from the image;

instructions for executing the set of pre-recognition functions using the first set of parameter settings to modify the second image according to the first set of parameter settings to produce a modified second image; and instructions for executing the optical character recognition function on the modified second image to produce a second output.

10. The computer-program product of claim 9, further comprising instructions for iteratively performing the following operations after determining an accuracy score for each set of parameter settings in the population:

removing at least one set of parameter settings from the population based on the accuracy scores; and mixing the parameter settings of the remaining sets of parameter settings to form new sets of parameter settings in the population.

11. The computer-program product of claim 10, further comprising instructions for randomly changing at least one parameter setting in at least one set of parameter settings in the population after mixing the parameter settings to form new sets of parameter settings.

12. The computer-program product of claim 10, wherein the instructions are configured to be iteratively performed until at least one of the accuracy scores exceeds a predetermined threshold.

13. The computer-program product of claim 9, wherein the instructions for executing the optical character recognition function are configured to use the set of parameter settings.

14. The computer-program product of claim 9, further comprising instructions for executing a set of post-recognition functions using the set of parameter settings to modify the output after executing the optical character recognition function.

15. The computer-program product of claim 9, wherein the computer-program product further includes instructions for adjusting at least one of the sets of parameter settings based on environmental factors associated with acquisition of the image.

16. A computer system, comprising:
a processor;
a memory; and
a program module, wherein the program module is stored in the memory and configurable to be executed by the processor to optimize parameter settings for optical character recognition, the program module including:
instructions for receiving a population comprising at least two sets of parameter settings;
instructions for receiving an image comprising known text;
for each set of parameter settings in the population, instructions for determining an accuracy score by:
executing a set of pre-recognition functions using the set of parameter settings to modify the image according to the parameter settings to produce a modified image;
executing an optical character recognition function on the known text in the modified image to produce an output; and
testing the output to determine the accuracy score for the set of parameter settings by comparing the known text to the output;
instructions for selecting a first set of parameter settings from the population based on the determined accuracy scores;
instructions for receiving a second image separate from the image;
instructions for executing the set of pre-recognition functions using the first set of parameter settings to modify the second image according to the first set of parameter settings to produce a modified second image; and
instructions for executing the optical character recognition function on the modified second image to produce a second output.

17. The computer system of claim 16, further comprising instructions for iteratively performing the following operations after determining an accuracy score for each set of parameter settings in the population:
removing at least one set of parameter settings from the population based on the accuracy scores; and
mixing the parameter settings of the remaining sets of parameter settings to form new sets of parameter settings in the population.

18. The computer system of claim 17, further comprising instructions for randomly changing at least one parameter setting in at least one set of parameter settings in the population after mixing the parameter settings to form new sets of parameter settings.

19. The computer system of claim 17, wherein the instructions are configured to be iteratively performed until at least one of the accuracy scores exceeds a pre-determined threshold.

20. The computer system of claim 16, wherein the instructions for executing the optical character recognition function are configured to use the set of parameter settings.

21. The computer system of claim 16, further comprising instructions for executing a set of post-recognition functions using the set of parameter settings to modify the output after executing the optical character recognition function.

22. The computer system of claim 16, wherein the program module further includes instructions for adjusting at least one of the sets of parameter settings based on environmental factors associated with acquisition of the image.

* * * * *